United States Patent [19]
Fyvie et al.

[11] Patent Number: 5,214,183
[45] Date of Patent: May 25, 1993

[54] METHOD FOR MAKING OLIGOMERIC BISPHENOL MONOCHLOROFORMATE POLYCARBONATE OLIGOMERS AND PRODUCT

[75] Inventors: Thomas J. Fyvie, Schenectady; James M. Silva, Clifton Park, both of N.Y.

[73] Assignee: General Electric Company, Schenectady, N.Y.

[21] Appl. No.: 754,486

[22] Filed: Sep. 3, 1991

Related U.S. Application Data

[63] Continuation of Ser. No. 519,980, May 7, 1990, abandoned.

[51] Int. Cl.$^5$ .............................................. C07C 69/96
[52] U.S. Cl. ..................................... 558/268; 558/271
[58] Field of Search ............................. 558/271, 268

[56] References Cited

U.S. PATENT DOCUMENTS

| | | | |
|---|---|---|---|
| 3,193,528 | 7/1965 | Miller et al. | 528/196 |
| 3,254,051 | 5/1966 | Schmitt | 558/277 X |
| 3,974,126 | 8/1976 | Narita et al. | 558/277 X |
| 4,038,252 | 7/1977 | Vernabken et al. | 558/277 X |
| 4,367,330 | 1/1983 | Hucks et al. | 558/277 X |
| 4,737,573 | 4/1988 | Silva et al. | 558/277 X |
| 4,743,676 | 5/1988 | Silva et al. | 558/277 X |

FOREIGN PATENT DOCUMENTS

| | | |
|---|---|---|
| 263432 | 4/1988 | European Pat. Off. . |
| 2204648 | 10/1973 | France . |
| 263432 | 4/1988 | France . |
| 274743 | 7/1988 | France . |
| 289826 | 11/1988 | France . |
| WO88/0199 | 8/1987 | PCT Int'l Appl. . |

*Primary Examiner*—Jose G. Dees
*Assistant Examiner*—Joseph M. Conrad
*Attorney, Agent, or Firm*—William A. Teoli; William H. Pittman

[57] ABSTRACT

A process for making bisphenol monochloroformate polycarbonate oligomers is provided by continuously introducing phosgene into a bisphenol mixture under agitated interfacial conditions. The pH of the phosgenation mixture falls below a predetermined value, thereby effecting the introduction of an aqueous alkali hydroxide consistent with the use of particular base introduction control systems. In accordance with the use of such control systems, the pH of the mixture can be stabilized, and the phosgenation and base introduction terminated when the pH of the mixture suddenly dips at least about 1 pH unit, or a sudden increase in the flow rate of aqueous alkali metal hydroxide is noted after a plateau in the rate of base introduction.

3 Claims, No Drawings

METHOD FOR MAKING OLIGOMERIC BISPHENOL MONOCHLOROFORMATE POLYCARBONATE OLIGOMERS AND PRODUCT

This application is a continuation of application Ser. No. 07/519,980, filed May 7, 1990.

CROSS REFERENCE TO RELATED APPLICATIONS

Reference is made to copending application RD-19,636, assigned to the same assignee as the present invention and incorporated herein by reference.

BACKGROUND OF THE INVENTION

The present invention relates to a method for making bisphenol monochloroformate polycarbonate oligomers useful for making high molecular weight aromatic polycarbonates and cyclic oligomeric carbonates.

Prior to the present invention, as shown by Miller et al, U.S. Pat. No. 3,193,528, bisphenol monochloroformate monomers were prepared by reacting phosgene with a dihydroxy aromatic compound in the presence of dilute aqueous caustic. The resulting bisphenol monochloroformate monomers can be subsequently polymerized, or copolymerized by dissolving the bisphenol monochloroformate monomers, or a mixture of monochloroformates of different dihydroxy aromatic compounds in an organic solvent in the presence of aqueous caustic and a polymerization catalyst. Additional procedures for making, or using monochloroformate monomers are shown by U.S. Pat. No. 3,254,051.

SUMMARY OF THE INVENTION

The present invention is based on the discovery that in addition to bisphenol monochloroformate monomers, bisphenol monochloroformate polycarbonate oligomers can be made by phosgenating bisphenol while it is being agitated under interfacial reaction conditions at a pH which can initially be up to about 11.2. Formation of the bisphenol monochloroformate polycarbonate oligomer can be detected and phosgenation discontinued at the occurrence of a pH dip, or a sudden increase in the base demand depending upon the base control delivery system used for introducing aqueous make-up alkali metal hydroxide into the phosgenation mixture, whenever the pH of the phosgenation mixture falls below a previously determined set point.

After initiation of the phosgenation, the pH of the mixture is allowed to continuously drop until a predetermined pH set point is reached, for example 8. A pH control system is then actuated which is set to deliver aqueous alkali metal hydroxide into the phosgenation mixture at a rate which is sufficient to maintain the pH at the set point (Control System A), or to introduce alkali metal hydroxide at a molar rate of up to about 2.5 times the molar rate of phosgene introduction (Control System B). It has been found that during this initial phase of alkali metal hydroxide introduction, the pH of the phosgenation mixture can cycle about the set point during the major part of the phosgenation period. In instances where Control System B is used, the pH of the mixture can eventually assume a substantially constant or stabilized value at a level of about 0.1–0.5 units below the pH set point, and thereafter suddenly decrease to a value of at least 1 pH unit below its previously substantially constant or stabilized value. At this point, the formation of bisphenol monochloroformate polycarbonate oligomer has taken place, and the introduction of additional phosgene and aqueous alkali metal hydroxide can be discontinued. In instances where Control System A is used, there can be a plateau in the rate of delivery of the aqueous alkali metal hydroxide followed by a sudden substantial increase in aqueous alkali metal hydroxide requirements.

STATEMENT OF THE INVENTION

There is provided by the present invention, a method for making bisphenol monochloroformate polycarbonate oligomers which comprises, (1) introducing phosgene, under interfacial reaction conditions at a temperature of from 15° C. to about 50° C. into an agitated mixture comprising bisphenol, having a pH of about 3 to about 11.2, (2) continuing to phosgenate and allowing the further introduction of make-up aqueous alkali metal hydroxide into the mixture of (1) to proceed whenever the pH of the mixture decreases below a predetermined pH set point of between about 3 and about 10.5, in accordance with a system controlling the rate at which the make-up aqueous alkali metal hydroxide is introduced into the mixture, where Control System A substantially maintains the pH at the pH set point, while Control System B allows aqueous alkali metal hydroxide to be introduced at a rate sufficient to provide a rate ratio with respect to the rate of moles of aqueous alkali metal hydroxide introduction, to the rate of moles of phosgene introduction which has a value of up to about 2.5 (Control System B), (3) terminating the introduction of phosgene and aqueous alkali metal hydroxide into the mixture of (2) when as a result of using Control System A, there is shown a sudden substantial increase in base demand after a relatively longer plateau period of base demand, or as a result of using Control System B, the pH of the phosgenation mixture assumes a substantially constant or stabilized value at a level of about 0.1–0.5 units below the pH set point, and thereafter suddenly decreases to a value of at least 1 pH unit below its previously substantially constant or stabilized value, and (4) recovering bisphenol monochloroformate polycarbonate oligomer from the mixture of (3).

Another aspect of the present invention is directed to bisphenol monochloroformate oligomers comprising substantially linear polycarbonate oligomers consisting essentially of condensed carbonate units of the formula,

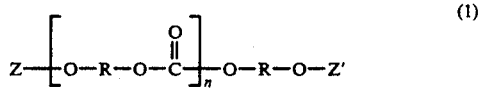

where R is a divalent $C_{(6-30)}$ aromatic organic radical, Z and Z' are either H or

and n is an integer having a value of 0 to 40, and the -OH and

terminal units of the bisphenol monochloroformate polycarbonate oligomers are present in an amount sufficient to provide an

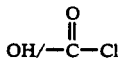

ratio having a value of from about 0.9 to about 1.1. The overall monochloroformate oligomer mixture comprises bischloroformate oligomers (both ends chloroformate), monochloroformate oligomers (one hydroxyl end and one chloroformate end), and bishydroxy oligomers (both ends hydroxyl). The relative proportions of these oligomers in the bisphenol monochloroformate polycarbonate oligomer are substantially 1:2:1 for the bischloroformate, monochloroformate, and bishydroxyl.

Bisphenols or mixtures thereof which can be used in the practice of the present invention to make the bisphenol monochloroformate polycarbonate oligomers are for example, resorcinol
4-bromoresorcinol
hydroquinone
4,4'-dihydroxybiphenyl
1,6-dihydroxynaphthalene
2,6-dihydroxynaphthalene
bis(4-hydroxypenyl)methane
bis(4-hydroxyphenyl)diphenylmethane
bis(4-hydroxyphenyl)-1-naphthylmethane
1,1-bis(4-hydroxyphenyl)ethane
1,2-bis(4-hydroxyphenyl)ethane
1,1-bis(4-hydroxyphenyl)-1-phenylethane
2,2-bis(4-hydroxyphenyl)propane ("bisphenol A")
2-(4-hydroxyphenyl)-2-)3-hydroxyphenyl)propane
2,2-bis(4-hydroxyphenyl)butane
1,1-bis(4-hydroxyphenyl)isobutane
1,1-bis(4-hydroxyphenyl)cyclohexane
1,1-bis(4-hydroxyphenyl)cyclododecane
trans-2,3-bis(4-hydroxyphenyl)-2-butene
2,2-bis(4-hydroxyphenyl)adamantane
α,α'-bis(4-hydroxyphenyl)toluene
bis(4-hydroxyphenyl)acetonitrile
2,2-bis(3-methyl-4-hydroxyphenyl)propane
2,2-bis(3-ethyl-4-hydroxyphenyl)propane
2,2-bis(3-n-propyl-4-hydroxyphenyl)propane
2,2-bis(3-isopropyl-4-hydroxyphenyl)propane
2,2-bis(3-sec-butyl-4-hydroxyphenyl)propane
2,2-bis(3-t-butyl-4-hydroxyphenyl)propane2,2-Bis(3-cyclohexyl-4-hydroxyphenyl)propane
2,2-bis(3-allyl-4-hydroxyphenyl)propane
2,2-bis(3-methoxy-4-hydroxyphenyl)propane
2,2-bis(3,5-dimethyl-4-hydroxyphenyl)propane
2,2-bis(2,3,5,6-tetramethyl-4-hydroxyphenyl)propane
2,2-bis(3-5-dichloro-4-hydroxyphenyl)propane
2,2-bis(3,5-dibromo-4-hydroxyphenyl)propane
2,2-bis(2,6-dibromo-3,5-dimethyl-4-hydroxyphenyl)propane
α,α-bis(4-hydroxyphenyl)toluene
α,α,α',α'-Tetramethyl-α,α'-bis(4-hydroxyphenyl)-p-xylene
2,2-bis(4-hydroxyphenyl)hexafluoropropane
1,1-dichloro-2,2-bis(4-hydroxyphenyl)ethylene
1,1-dibromo-2,2-bis(4-hydroxyphenyl)ethylene
1,1-dichloro-2,2-bis(5-phenoxy-4-hydroxyphenyl)ethylene
4,4'-dihydroxybenzophenone
3,3-bis(4-hydroxyphenyl)-2-butanone
1,6-bis(4-hydroxyphenyl)-1,6-hexanedione
ethylene glycol bis(4-hydroxyphenyl)ether
bis(4-hydroxyphenyl)ether
bis(4-hydroxyphenyl)sulfide
bis(4-hydroxyphenyl)sulfoxide
bis(4-hydroxyphenyl)sulfone
bis(3,5-dimethyl-4-hydroxyphenyl)sulfone
9,9-bis(4-hydroxyphenyl)fluorene
2,7-dihydroxypyrene
6,6'-dihydroxy-3,3,3',3'-tetramethylspiro(bis)indane("spirobiindane bisphenol")
3,3-bis(4-hydroxyphenyl)phthalide
2,6-dihydroxydibenzo-p-dioxin
2,6-dihydroxythianthrene
2,7-dihydroxyphenoxathiin
2,7-dihydroxy-9,10-dimethylphenazine
3,6-dihydroxydibenzofuran
3,6-dihydroxydibenzothiophene
2,7-dihydroxycarbazole A possible explanation as to why the aqueous alkali metal hydroxide flow rate suddenly increases when using Control System A, or the pH suddenly drops when using Control System B, is that there are two reactions occurring during the phosgenation. Firstly, phosgene condenses with a hydroxyl on a bisphenol to make chloroformate. As a result, HCl is generated, which requires an equimolar amount of alkali metal hydroxide to maintain the desired pH level. This reaction constitutes the major part of the phosgenation, and provides a relatively steady rate of HCl generation, which is proportional to the phosgenation rate. However, as more and more chloroformate end groups are formed, a second reaction also becomes significant, i.e. the reaction between chloroformate and aromatic hydroxyls. This reaction also generates HCl, which again requires alkali hydroxide for neutralization. The rate of chloroformate aromatic hydroxyl condensation reaction depends substantially on the product of chloroformate and aromatic hydroxyl end group concentrations. Early in the reaction, there is an abundance of aromatic hydroxyl end groups, but few chloroformate end groups. As the phosgenation proceeds, the number of chloroformate end groups increases while the number of aromatic hydroxyl end groups decreases. The product of chloroformate and aromatic hydroxyl end group concentrations achieves a maximum when there is an equal number of each type end group, which corresponds to bisphenol monochloroformate polycarbonate oligomer. When the product of end group concentrations is maximized, the rate of condensation is also maximized, which coincides with a maximum in the HCl production rate due to this condensation reaction. The increase in rate of HCl production manifests itself either as a pH dip (Control Method B) or as an increase in aqueous alkali metal hydroxide delivery rate (Control Method A). Either of these events may be used to signal the formation of the bisphenol monochloroformate polycarbonate oligomer.

In the practice of the present invention, a reaction mixture is prepared by blending bisphenol, with an organic solvent, such as methylene chloride, and optionally with a tertiary organic amine, for example, triethylamine, water and about 0.0-0.2 mol of alkali metal hydroxide, for example, sodium hydroxide, per mol of bisphenol. Sufficient alkali metal hydroxide can be utilized to raise the pH of the bisphenol reaction mixture, prior to phosgenation, to a value of about 11 resulting in the dissolution of some of the bisphenol into the aqueous phase. There also can be utilized from about 0 to 200 parts per million of a tertiary organic amine, such as triethylamine, relative to the weight of the organic solvent used in the formulation. Suitable organic solvents which can be used are for example, aliphatic hydrocarbons, such as hexane and heptane; chlorinated aliphatic hydrocarbons, such as methylene chloride, chloroform, carbon tetrachloride, dichloroethane, trichloroethane, tetrachloroethane, dichloropropane and 1,2-dichloroethylene; aromatic hydrocarbons, such as benzene, toluene and xylene; substituted aromatic hydrocarbons such as, chlorobenzene, o-dichlorobenzene, the various chlorotoluenes, nitrobenzene, and acetophenone; and carbon disulfide. The chlorinated aliphatic hydrocarbons, especially methylene chloride, are preferred.

Aqueous alkali, or alkaline earth metal hydroxide can be used to maintain the pH of the phosgenation mixture near the pH set point, which may be in the range of between about 3 to about 10.5. Some of the alkali metal or alkaline earth metal hydroxides, which can be employed are for example, sodium hydroxide, potassium hydroxide, and calcium hydroxide. Sodium and potassium hydroxides, and particularly sodium hydroxide is preferred. The concentration of the alkali hydroxide solution which is utilized is not critical and can be between about 0.2-19M. Alkali concentrations of at least 5M are preferred.

The bisphenol polycarbonate monochloroformate oligomer forming reaction can be conducted in a wide variety of either semi-batch or continuous reactors. Such reactors are, for example, stirred tank reactors, which may be either semi-batch or continuous flow. Additional reactors which are included are agitated column and recirculating loop continuous reactors.

The volume ratio of aqueous to organic phase during and at the termination of the phosgenation reaction can be in the range of about 0.2-1:1. Reaction temperatures can be in the range of between about 15°-50° C. When the preferred organic liquid is utilized, such as methylene chloride, the reaction may be conducted at reflux which can be 35°-42° C. The reaction can be conducted at atmospheric pressures, although sub- or superatmospheric pressures may be employed if desired.

During phosgenation, the mixture is agitated, such as, by using a stirrer or other conventional equipment. The phosgenation rate can vary from between about 0.02-0.2 mol of phosgene, per mol of bisphenol per minute. During phosgenation, the pH is maintained at a desired value, frequently termed the pH set point, for example 8, which is chosen from the range of about 3 to about 10.5. A pH set point value at the low end of this range is desirable for making the bisphenol monochloroformate polycarbonate oligomer that can be utilized in making oligomeric cyclic mixtures; a pH set point value above about 8 is desirable for making oligomeric monochloroformate mixtures that will be utilized in making linear polymer.

One pH control method is to add aqueous alkali metal hydroxide to maintain the pH near the pH set point, at a maximum rate of about 2-2.5 mol NaOH/min per mole $COCl_2$/min (Control System B). For example, an on/off pH control technique may be used. Aqueous alkali metal hydroxide is added whenever the pH of the system falls below the pH set point, at a rate of about 2.0 to about 2.5 mol NaOH/min per mol $COCl_2$/min. This on/off pH control technique can result in pH cycles in which the pH overshoots the set point by about 0.3-1 unit after the base pump is shut off and undershoots the set point by 1-2 units after the base pump is turned on. After at least about 0.6 mol $COCl_2$, per mol bisphenol has been added, the pH of the system stabilizes at a level of about 0.1-0.5 pH units below the pH set point, during which time the base pump is on continuously. Termination of phosgene and alkali metal hydroxide introduction is effected at the point when a sudden decrease in the pH is detected after the pH of the mixture has substantially stabilized. A second pH control method is to add aqueous alkali metal hydroxide to maintain the pH near the pH set point, at a maximum rate of at least about 3 and preferably at least about 4 mol NaOH/min per mol $COCl_2$/min (Control System A). This pH control technique can also result in fluctuating alkali metal hydroxide flow rates; however a moving average of the alkali metal hydroxide flow rate is substantially constant during the major part of the reaction, followed by a period of monotonically increasing flow rate. The period of the moving average is preferably about one alkali metal hydroxide flow rate cycle in duration. When the molar ratio of aqueous alkali metal hydroxide flow (moving average) to phosgene flow exceeds about 2.5-3.5, preferably about 3, the introduction of additional $COCl_2$ and aqueous alkali metal hydroxide can be discontinued.

In order that those skilled in the art will be better able to practice the present invention the following examples are given by way of illustration and not by way of limitation. All parts are by weight.

Example 1

There was charged to a reactor, 186 grams (0.816 moles) of bisphenol A, 550 ml of methylene chloride, 250 ml of water, 5 ml of an aqueous 50 weight percent sodium hydroxide solution and 0-50 ppm of triethylamine based on the weight of methylene chloride. There was used a one liter reactor which was fitted with a dual turbine blade agitator, condenser, a phosgene addition dip tube, a sodium hydroxide addition dip tube, and a pH electrode in a recirculation loop. The pH controller turned on and off a pump which was set to deliver a sodium hydroxide flow rate of about twice the molar phosgene flow rate. The phosgenation rate was 5.8 grams/min., for 13.92-18 minutes (1.01-1.31 mole $COCl_2$/mol BPA). The sodium hydroxide pump was set to deliver a 50 weight percent of sodium hydroxide (19M) at 6.7 ml/min.

As shown below in Table 1, a series of phosgenation reactions (RXN 1-9) was run using the above apparatus with various temperature, triethylamine, and pH levels. A temperature of 20° C. was used in one instance at a pH of 5, which resulted in monochloroformate having a reduced unit length. In most instances reflux conditions were used and the pH set point was 8.2. The reactions (1-6) were sampled at the pH dip of at least 1 pH unit after the pH of the mixture remained substantially constant at about 0.2-0.5 pH units below the pH set point. A sample was taken immediately and analyzed by HPLC to determine the

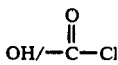

ratio. For comparison, a predominantly bischloroformate product (7-9) was made by utilizing higher levels of phosgene (1.3 moles $COCl_2$/mol BPA). The following results were obtained, where $Et_3N$ is triethylamine, CF is chloroformate, and DP is average number of condensed units:

TABLE 1

| RXN | ppm $Et_3N$ | T (C.) | pH Set pt | mol $COCl_2$ mol BPA (1) | mol $COCl_2$ mol BPA (2) | mol OH ends mol CF ends | Number Avg DP |
|---|---|---|---|---|---|---|---|
| 1 | 0 | 20 | 5 | 1.31 | 1.01 | 0.96 | 1.5 |
| 2 | 0 | 39 | 8.2 | 1.08 | 1.01 | 0.94 | 2.7 |
| 3 | 50 | 39 | 8.2 | 1.01 | 1.00 | 1.03 | 3.7 |
| 4 | 50 | 39 | 8.2 | 1.01 | 0.98 | 1.09 | 3.2 |
| 5 | 50 | 39 | 8.2 | 1.01 | 0.99 | 1.12 | 3.6 |
| 6 | 50 | 39 | 8.2 | 1.02 | 1.00 | 1.02 | 3.75 |
| 7 | 0 | 39 | 8.2 | 1.3 | 1.14 | 0.09 | 5.3 |
| 8 | 25 | 39 | 8.2 | 1.3 | 1.13 | 0.23 | 4.6 |
| 9 | 50 | 39 | 8.2 | 1.3 | 1.06 | 0.27 | 7.4 |

(1) delivered
(2) incorporated into oligomer

The above results show that substantially bisphenol monochloroformate polycarbonate oligomer is obtained as shown by an OH/CF ratio of about 1 for reactions 1-6. A lower ratio of hydroxyl end groups to chloroformate end groups is present in the bisphenol bischloroformate oligomer (7-9) as compared to the monochloroformate oligomer (1-6).

Example 2

The procedure of Example 1 was repeated, except that no triethylamine was introduced into the mixture. A pH dip occurred about 14 minutes and 50 seconds after phosgenation was initiated. The phosgenation and sodium hydroxide introduction were shutoff. The bisphenol monochloroformate polycarbonate oligomer was analyzed by HPLC and the results are shown below in Table 2, where MCF is monochloroformate, BCF is bischloroformate, BPA is bisphenol A, and L-2 to L-8 indicate the unit length of linear bisphenol A carbonate oligomers terminated with OH. Higher oligomers indicate linears having more than 8 bisphenol A carbonate units, while Total MCF, Total BCF and Total linears are the sums of the respective materials present in the mixture.

TABLE 2

| Phosgenation Reaction Conditions and Product Results | |
|---|---|
| Oligomer Reaction Conditions | |
| mol $COCL_2$ delivered/mol BPA | 1.08 |
| Temp., C. | 39 |
| pH | 8.2 |
| Oligomer Product, Mol % | |
| 1-MCF | 8.22 |
| 2-MCF | 10.94 |
| 3-MCF | 8.68 |
| 4-MCF | 6.98 |
| 5-MCF | 4.99 |
| 6-MCF | 3.05 |
| 7-MCF | 1.80 |
| 1-BCF | 6.04 |
| 2-BCF | 4.79 |
| 3-BCF | 3.19 |
| 4-BCF | 2.39 |
| 5-BCF | 1.29 |
| 6-BCF | 0.69 |
| BPA | 0.54 |
| L-2 | 4.03 |
| L-3 | 5.86 |
| L-4 | 4.65 |
| L-5 | 3.60 |
| L-6 | 2.54 |
| L-7 | 1.67 |
| L-8 | 1.22 |
| Higher Oligomers | 10.52 |
| Total MCF | 49.70 |
| Total BCF | 21.17 |
| Total Linears | 26.81 |

The above results show that the product is substantially oligomeric bisphenol monochloroformate polycarbonate oligomers having molar proportions of substantially 2:1:1 of oligomeric bisphenol monochloroformates, oligomeric bisphenol bischloroformates, and bishydroxy terminated polycarbonate oligomers.

Example 3

There was added to 100 ml of a $CH_2Cl_2$ solution of the monochloroformate oligomer mixture of example 2 having 22 ½% solids, 0.779 gm of phenyl chloroformate as an endcap, 58 mg of triethylamine, 35 ml of $H_2O$, and 0.4 ml of a 50 wt % NaOH aqueous solution. The mixture was heated to 30° C. while it was stirred.

The pH of the mixture was maintained at 11-11.5 by controlling the introduction of the 50 wt % NaOH aqueous solution. After 10 minutes, 3.1 ml NaOH solution had been added. The reaction was stirred for another 10 minutes. The organic phase was removed and analyzed by gel permeation chromatography. There was obtained a phenyl capped polycarbonate having weight average molecular weight of 20,900 and a polydispersity of 2.44. Additionally, analysis by Fourier Transform Infrared spectroscopy showed that the mixture had less than 20 ppm aromatic hydroxyl endgroups.

Example 4

Phosgene was introduced at a rate of 4.6 gm/min into a mixture of 186 gm bisphenol A, 550 ml methylene chloride, 250 ml water, 2.5 ml 50 wt % NaOH, and 36 mg triethylamine. The maximum NaOH delivery rate was set to 14 ml/min. A proportional pH control system was used to control the rate of introduction of 50 wt % NaOH. A pH set point of 8.2 was used. The phosgenation was initially conducted at room temperature and was allowed to exotherm to the temperature of refluxing $CH_2Cl_2$ (40° C.). An average NaOH flow rate of 4 ml/min was used during the interval between 4 and 18 minutes after the start of phosgenation. Although the instantaneous NaOH flow rate varied from 0-14 ml/min, the standard deviation of a one minute moving average of the NaOH flow rate was only 0.9 ml/min during this period. After a period of a relative uniform base demand, the base demand suddenly increased. Samples A and B were taken at 18.2 and 19.2 minutes, respectively. These samples had 1 minute moving average NaOH flow rates of 6.1 and 9.1 ml/min, respectively. The composition and the OH/CF end group ratio for these samples is shown below in Table 3. The threshold NaOH flow rate (one minute moving average) to identify the stoichiometric point was set to 3 mol NaOH/min, per mol $COCl_2$/min, which corresponds to 7.4 ml NaOH/min. The NaOH flow rate for Sample A was below the threshold and the OH/CF ratio indicates that the stoichiometric amount of $COCl_2$ had not yet been delivered when the sample was taken. The NaOH flow rate for Sample B was above the threshold and the OH/CF ratio indicates that the stoichiometric amount of $COCl_2$ had been delivered by the time the sample was taken.

TABLE 3

Oligomer Compositions for Example 4

| Mol repeat/l | Sample A | Sample B |
|---|---|---|
| BPA | 0.059 | 0.024 |
| L-2 | 0.090 | 0.049 |
| L-3 | 0.065 | 0.047 |
| L-4 | 0.043 | 0.034 |
| L-5 | 0.029 | 0.024 |
| L-6 | 0.021 | 0.020 |
| L-7 | 0.012 | 0.014 |
| L-8 | 0.009 | 0.009 |
| L-9 | 0.008 | 0.007 |
| L-10 | 0.005 | 0.005 |
| L-11 | 0.004 | 0.004 |
| L-12 | 0.000 | 0.000 |
| BPA-MCF | 0.233 | 0.189 |
| DIMER-MCF | 0.119 | 0.117 |
| 3-MCF | 0.078 | 0.084 |
| 4-MCF | 0.053 | 0.060 |
| 5-MCF | 0.033 | 0.042 |
| 6-MCF | 0.019 | 0.027 |
| 7-MCF | 0.015 | 0.018 |
| 8-MCF | 0.011 | 0.012 |
| 9-MCF | 0.008 | 0.009 |
| 10-MCF | 0.008 | 0.009 |
| 11-MCF | 0.000 | 0.011 |
| 12-MCF | 0.000 | 0.000 |
| BPA-BCF | 0.038 | 0.053 |
| DIMER-BCF | 0.039 | 0.059 |
| 3-BCF | 0.027 | 0.042 |
| 4-BCF | 0.015 | 0.024 |
| 5-BCF | 0.008 | 0.014 |
| 6-BCF | 0.007 | 0.010 |
| 7-BCF | 0.004 | 0.007 |
| 8-BCF | 0.004 | 0.005 |
| 9-BCF | 0.000 | 0.008 |
| 10-BCF | 0.000 | 0.000 |
| High Oligomer | 0.083 | 0.111 |
| Total | 1.149 | 1.149 |
| mol OH/mol CF | 1.305 | 0.911 |

Although the above examples are directed to only a few of the very many variables which can be used in the practice of the method of the present invention as well as the compositions obtained therefrom, it should be understood that the present invention is directed to methods for making a much broader variety of bisphenol monochloroformate polycarbonate oligomers as shown in the description preceding these examples.

What is claimed is:

1. An oligomeric monochloroformate mixture of bisphenol polycarbonate consisting essentially of monomers and oligomers which are bishydroxy-terminated, bischloroformate-terminated and monohydroxy and monochloroformate-terminated in a molar ratio of about 1:1:2, which monomers and oligomers have terminal OH and COCl groups present in a ratio of OH/COCl having a value of about 0.9 to about 1.1, where the oligomeric monochloroformate mixture is formed by introducing a solution of alkali metal hydroxide into a bisphenol phogenation mixture under interfacial reaction conditions until a stoichiometric endpoint is reached whereupon the introduction of phosgene and alkali metal hydroxide into the bisphenol phosgenation mixture is terminated, and where in the initial formation of the oligomeric monochloroformate mixture, (a) the aqueous alkali metal hydroxide is introduced into the bisphenol phosgenation mixture at a moving average rate which is substantially constant during the major portion of the reaction and then monotonically increases up to about 3 moles of aqueous alkali metal hydroxide, per minute, per mole of phosgene per minute, which is sufficient to maintain the ph of the bisphenol phosgenation mixture at a predetermined pH set point falling within the range of about 3 to about 10.5, until the stoichiometric end point is reached as shown by a sudden increase in aqueous alkali metal hydroxide requirements which is sufficient to provide a moving average rate exceeding 3 moles of alkali metal hydroxide per minute, per mole of phosgene per minute or, (b) the alkali metal hydroxide is initially introduced into the bisphenol phosgenation mixture at a rate which is sufficient to provide up to about 2–2.5 moles of base per minute, per mole of phosgene per minute to substantially maintain the pH at, or around a predetermined pH set point falling within the range of about 3 to about 10.5 until the stoichiometric end point is reached which is shown by a period during which the pH of the phosgenation mixture assumes a substantially constant or stabilized value at a level of about 0.1–0.5 units below the pH set point, and thereafter suddenly decreases to a value of at least 1 pH unit below its previously substantially constant or stabilized value.

2. An oligomeric monochloroformate mixture of bisphenol A polycarbonate, in accordance with claim 1.

3. An oligomeric monochloroformate mixture of hydroquinone polycarbonate, in accordance with claim 1.

* * * * *